US009659418B2

(12) United States Patent
Stryjewski et al.

(10) Patent No.: US 9,659,418 B2

(45) Date of Patent: May 23, 2017

(54) LOCKING SYSTEMS

(71) Applicant: Vision Engineering Solutions, LLC, Orlando, FL (US)

(72) Inventors: John S. Stryjewski, Merritt Island, FL (US); Jason A. Lehmann, Rockledge, FL (US)

(73) Assignee: Vision Engineering Solutions, LLC, Merritt Island, FL (US)

( * ) Notice: Subject to any disclaimer, the term of this patent is extended or adjusted under 35 U.S.C. 154(b) by 0 days.

(21) Appl. No.: 14/804,330

(22) Filed: Jul. 20, 2015

(65) Prior Publication Data

US 2016/0019739 A1 Jan. 21, 2016

Related U.S. Application Data

(60) Provisional application No. 62/026,904, filed on Jul. 21, 2014.

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 19/00*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04L 9/14*** | (2006.01) |
| ***H04L 9/32*** | (2006.01) |
| ***H04Q 1/00*** | (2006.01) |
| ***H04Q 9/00*** | (2006.01) |
| ***G07C 9/00*** | (2006.01) |

(52) U.S. Cl.

CPC .................................... *G07C 9/00* (2013.01)

(58) Field of Classification Search

CPC ........... G07C 9/00309; G07C 9/00896; G07C 9/00571

USPC ........................................................ 340/5.2

See application file for complete search history.

(56) References Cited

U.S. PATENT DOCUMENTS

| | | | | |
|---|---|---|---|---|
| 2011/0283241 | A1* | 11/2011 | Miller | G06F 3/04883 715/863 |
| 2012/0002691 | A1 | 1/2012 | Tao | |
| 2013/0190056 | A1* | 7/2013 | Chaudhri | G06F 3/04883 455/566 |
| 2014/0163751 | A1 | 6/2014 | Davis et al. | |

OTHER PUBLICATIONS

International Search Report for PCT International Application Serial No. PCT/US2015/041252, completed Oct. 16, 2015, (12 pages).

* cited by examiner

*Primary Examiner* — Tanmay Shah

(74) *Attorney, Agent, or Firm* — Barnes & Thornburg, LLP

(57) ABSTRACT

A locking system is disclosed. The locking system may move a lockable device included in the locking system between a locked and unlocked state. The lockable device may comprise a laser.

14 Claims, 5 Drawing Sheets

| Failure Mode | Mitigation | Result |
|---|---|---|
| Relay Fail Closed | Redundant Relays | Laser Safe |
| Relay Fail Open | None Required | Laser Safe |
| Timer Failure | Redundant Timers | Laser Safe |
| PIC32 HW Failure | No Retrigger Signal | Laser Safe |
| PIC32 SW Failure | No Retrigger Signal | Laser Safe |
| Ethernet Failure | No Retrigger Signal | Laser Safe |
| PAC Failure | No Retrigger Signal | Laser Safe |

*FIG. 4*

LOCKING SYSTEMS

This application claims the benefit of and priority to U.S. Provisional Patent Application No. 62/026,904 filed 21 Jul. 2014, the disclosure of which is now expressly incorporated herein by reference.

FIELD OF THE DISCLOSURE

The present disclosure relates generally to locking systems, and more specifically to fail-safe locking systems.

BACKGROUND

Some locking systems may cause harm to a user or to another if the locking system fails. As such, fail-safe locking systems are desired.

SUMMARY

The present disclosure may comprise one or more of the following features and combinations thereof and the claims appended hereto.

An illustrative locking system is disclosed herein. The locking system may comprise a lockable device, a computer, and an interface module. The lockable device may be arranged to move between a locked state in which the lockable device is blocked from being activated and an unlocked state in which the lockable device is free to be activated. The computer may be arranged to determine when to allow the lockable device to move between the locked and unlocked states. The interface module may be in communication with the computer and the lockable device. The interface module may be arranged to move the lockable device between the locked state and the unlocked state when the computer determines to allow the lockable device to move between the locked and unlocked states.

Illustratively, the interface module is arranged to move selectively the lockable device between the locked state and the unlocked state. Illustratively, the interface module comprises a processor, a primary circuit, and a secondary circuit. The lockable device is moved to the locked state if either or both of the primary circuit and the secondary circuits fail.

Illustratively, the primary circuit comprises a primary self-test timer system, a primary retriggerable timer system, a first primary logic system, a second primary logic system, and a primary relay system. Illustratively, the secondary circuit includes a secondary self-test timer system, a secondary retriggerable timer system, a first secondary logic system, a second secondary logic system, and a secondary relay system. Illustratively, the primary relay system, the secondary relay system, and the lockable device are connected in series in a circuit.

Also provided is an illustrative method of using the illustrative locking system according to any of the illustrative embodiments disclosed herein. The method may comprise the step of transmitting, from a computer, a first signal to an interface module, the computer arranged to determine when to allow a lockable device to move between a locked and an unlocked state, the interface module in communication with the computer and the lockable device, the interface module arranged to move the lockable device between the locked state and the unlocked state when the computer determines to allow the lockable device to move between the locked and unlocked states, and the first signal includes instructions to move the lockable device from the locked state to the unlocked state. The method may comprise the step of receiving, by the interface module, the first signal from the computer to move the lockable device from the locked state to the unlocked state. The method may comprise the step of moving, by the interface module, the lockable device from the locked state to the unlocked state in response to receiving the first signal.

In some embodiments, the method further comprises the step of moving the lockable device to the locked state if the first signal is not received by the interface module. In some embodiments, the method further comprises the step of transmitting a third signal, from the interface module, to the computer in response to receiving the first signal. In some embodiments, the method further comprises the step of moving the lockable device to the locked state if the third signal is not received by the computer.

These and other features of the present disclosure will become more apparent from the following description of the illustrative embodiments.

BRIEF DESCRIPTION OF THE DRAWINGS

FIG. 4 is a diagrammatic depiction of failure modes of the locking system of FIG. 1.

DETAILED DESCRIPTION OF THE DRAWINGS

Figure 1:
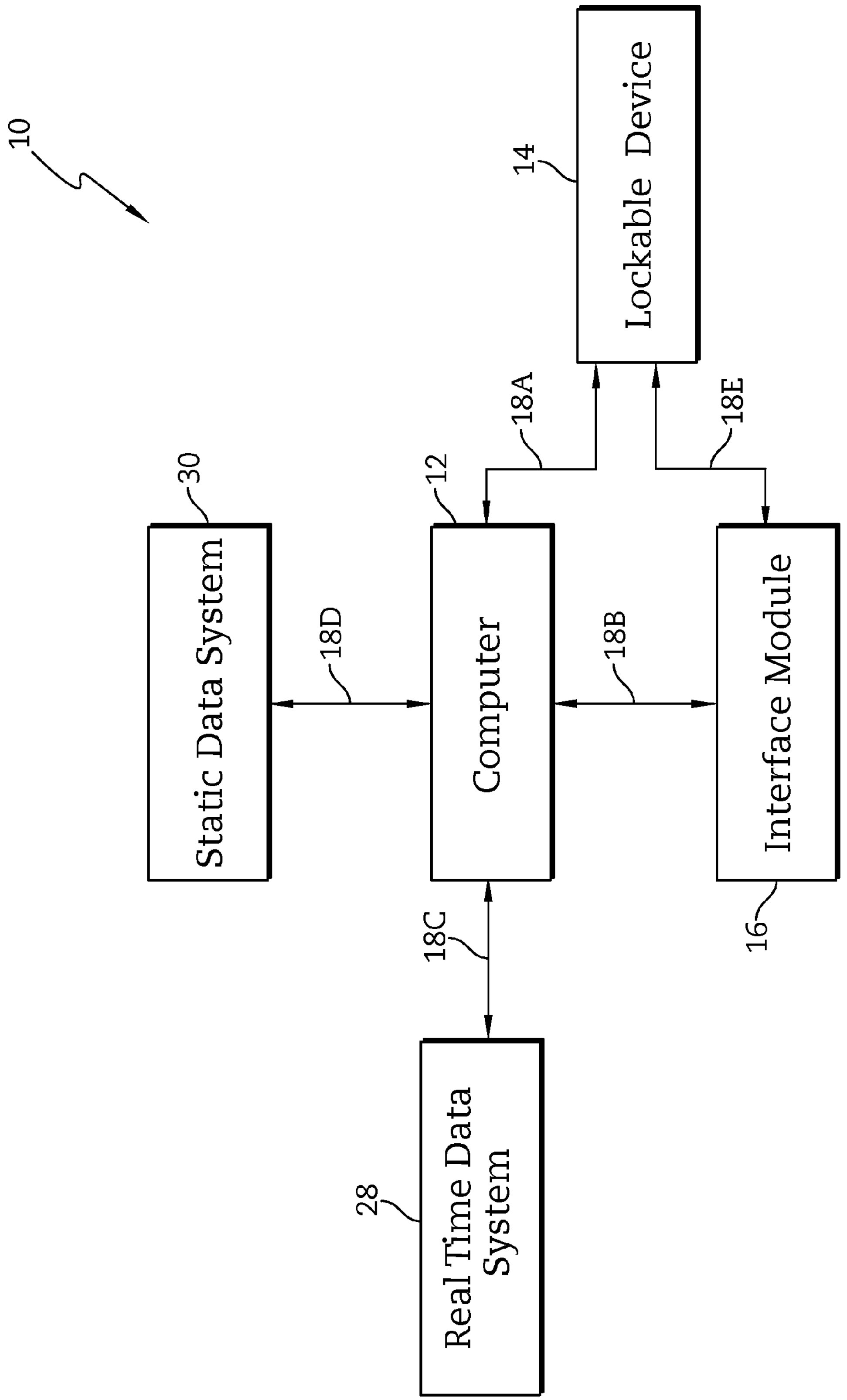
FIG. 1 is a diagrammatic depiction of an illustrative locking system.

For the purposes of promoting an understanding of the principles of the disclosure, reference will now be made to a number of illustrative embodiments illustrated in the drawings and specific language will be used to describe the same.

Referring to FIG. 1, an illustrative locking system 10 is depicted. The locking system 10 is configured to receive input from a user to move selectively a lockable device 14 included in the locking system 10 from a locked state in which the lockable device 14 is blocked from being activated to an unlocked state in which the lockable device 14 may be activated. Illustratively, the locking system 10 is a computer controlled fail-safe interlock system.

Illustratively, the lockable device 14 is a LASER 14 and the locking system 10 is configured to move the LASER 14 between a locked state in which the LASER 14 is blocked from being fired and an unlocked state in which the LASER 14 may be activated. The locking system 10 includes a number of checkpoints that must be passed before the lockable device 14 is moved to the unlocked state. As such, the locking system 10 blocks the lockable device 14 from moving from the locked state to the unlocked state unintentionally. If any of the checkpoints fail, the lockable device 14 defaults to the locked state and may not be activated. In the illustrative embodiment, after a checkpoint is failed, the lockable device 14 may not be moved to the unlocked state and, thus, may not be activated until a user has intervened with the locking system 10.

Referring to FIG. 1, the locking system 10 illustratively includes a computer 12, the lockable device 14, an interface module 16, a real time data system 28 (sometimes called RTD system 28), a static data system 30, and a plurality of data links 18. In the illustrative embodiment, the computer 12 is a predictive avoidance computer (PAC), the lockable device 14 is the LASER, the interface module 16 is illustratively a laser interface module (sometimes called Laser interface module or LIM). The predictive avoidance computer is arranged to determine windows of time to allow the lockable device to move the unlocked state so that it may be activated.

A first data link 18A connects the computer 12 with the lockable device 14. A second data link 18B connects the computer 12 with the interface module 16. A third data link 18C connects the computer 12 with the RTD system 28. A fourth data link 18D connects the computer 12 with the static data system 30. In the illustrative embodiment, the first data link 18A is Local Area Network (LAN) Ethernet. In the illustrative embodiment, the second, third, and fourth data links 18B, 18C, 18D are Ethernet data links used as part of a real time control circuit. A fifth data link 18E connects the interface module 16 with the lockable device 14. In the illustrative embodiment, the fifth data link 18E is an analog data link.

The computer 12 is configured to communicate information between the computer 12 and the lockable device 14, the interface module 16, the real time data system 28, and the static data system 30 as suggested in FIG. 1. In operation, the computer 12 receives a request from the lockable device 14 requesting the lockable device 14 be allowed to move from the locked to the unlocked state. Using information received from the real time data system 28 and the static data system 30, the computer 12 determines whether to allow the lockable device 14 to move to the unlocked state. If the computer 12 determines to allow the lockable device 14 to move to the unlocked state, the computer 12 sends instructions to the interface module 16 to move the lockable system 14 from the locked state to the unlocked state. If all checkpoints are passed in the interface module 16, the interface module 16 moves the lockable system 14 from the locked state to the unlocked state.

Illustratively, the computer 12 includes a local user interface 24 and a processor 26. The computer 12 may use one or more of a number of operating systems. The computer 12 may include one or more of a number of software programs including custom software written in one or more of a number of programming languages.

In the illustrative embodiment, the locking system 10 is attached to an airborne device and the real time data system 28 and the static data system 30 transmits information indicative of the airborne device and atmosphere to the computer 12. Illustratively, the real time data system 28 transmits information indicative of a latitude, longitude altitude, roll, pitch, yaw, azimuth elevation of the airborne device as well as system status bypass flags and Coordinated Universal Time (UTC). Illustratively, the static data system 30 transmits information indicative of PA data, cutout data, configuration data, and calibration data.

The lockable device 14 is any device that a user desires to be controlled by the interface module 16. Illustratively, the lockable device 14 may be any device that may be activated electronically. The lockable device 14 is movable between the locked state and the unlocked state. In the locked state, the lockable device 14 is blocked from being activated. In the unlocked state, the lockable device 14 is allowed to be activated. In the illustrative embodiment, the lockable device 14 defaults to the locked state.

In the illustrative embodiment, the lockable device 14 is the LASER 14. In other embodiments, the lockable device may be an electro-mechanical lock 14. In one example, the electro-mechanical lock 14 is positioned through a latch to block the latch from being opened. When the electro-mechanical lock 14 is moved to the unlocked state, the electro-mechanical lock 14 may be uncoupled from the latch so that the latch may be opened.

The LASER 14 includes a LASER head 76, a network interface 78, and a trigger lock 82. The LASER head 76 is movable between an inactive state in which the LASER head 76 does not produce a LASER beam and an active state in which the LASER head 76 produces a LASER beam. The network interface 78 is configured to receive user input to transmit a request to the computer 12 for the LASER head 76 to be activated. The network interface is further configured to move the LASER head 76 to the active state.

The trigger lock 82 blocks selectively the LASER head 76 from activating. The trigger lock 82 is coupled with the LASER head 76 and with the interface module 16. The trigger lock 82 is movable between the locked state in which the LASER head 76 is blocked from moving from the inactive state to the active state and the unlocked state in which the LASER head 76 is allowed to move from the inactive state to the active state. Illustratively, the trigger lock 82 defaults to the locked state. The trigger lock 82 moves to the unlocked state when the interface module 16 passes all of the checkpoints. If any of the checkpoints fail, the trigger lock 82 moves to the locked state by default.

Figure 2:
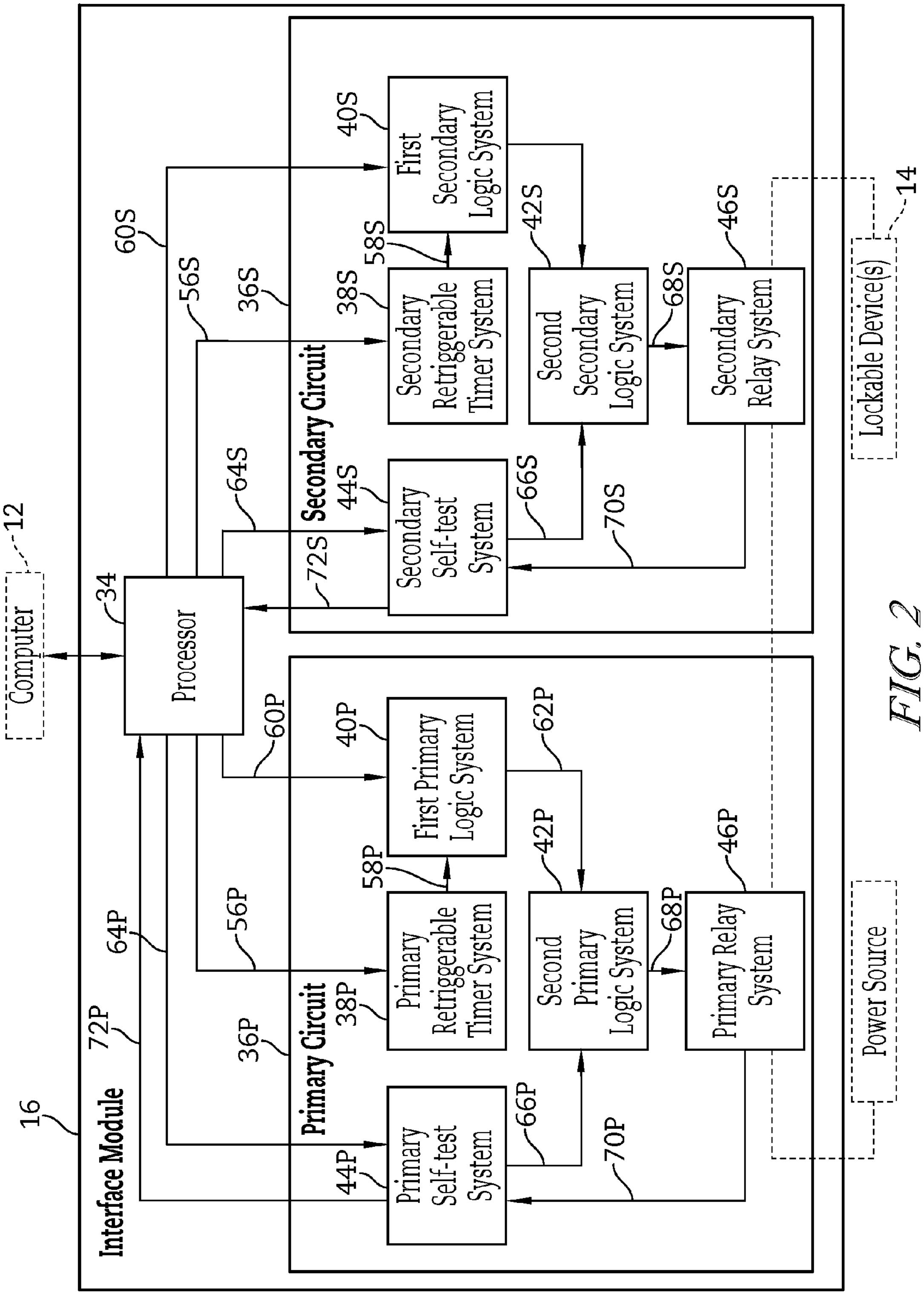
FIG. 2 is a diagrammatic depiction of an interface module included in the locking system of FIG. 1.
Figure 3:
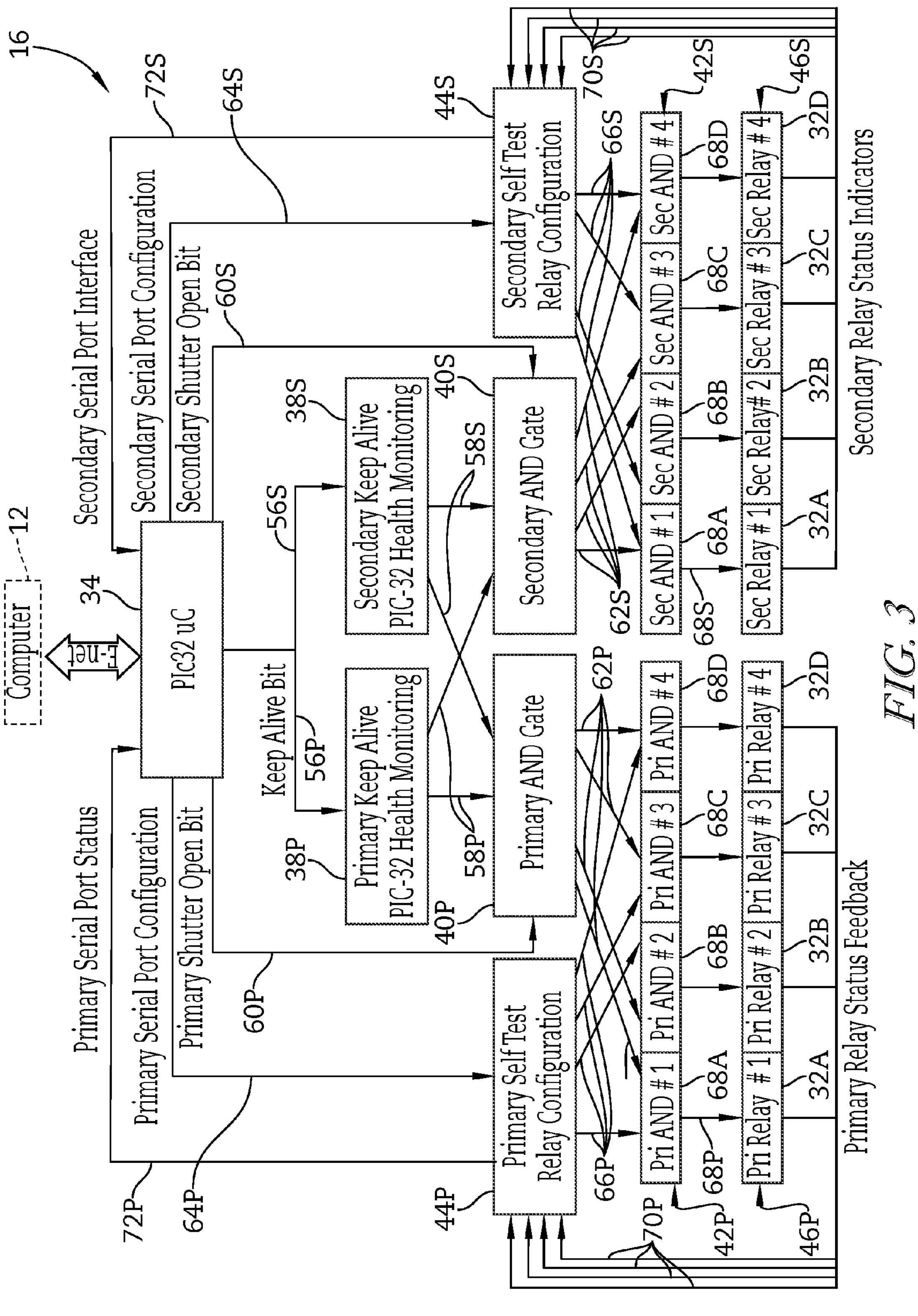
FIG. 3 is a diagrammatic depiction of the interface module of FIG. 2.

The interface module communicates with the computer 12 and the lockable device 14 to move selectively the lockable device 14 between the locked and unlocked state. The interface module 16 includes a processor 34, a primary circuit 36P, and a secondary circuit 36S as shown in FIGS. 2 and 3. The secondary circuit 36S is a redundant circuit arranged to block the lockable device from moving to the unlocked state unless both the primary and secondary circuits are working properly.

The primary circuit 36P includes a primary retriggerable timer 38P, a first primary logic system 40P, a second primary logic system 42P, a primary self-test system 44P, and a primary relay system 46P as shown in FIGS. 2 and 3. The secondary circuit 36S is substantially the same as the primary circuit 36P and is not discussed in detail.

The processor 34 receives instructions from the computer 12 and transmits signals to move the trigger lock 82 included in the lockable device 14 from the locked state to the unlocked state. In the illustrative embodiment, the processor 34 is connected to the computer 12, the retriggerable timers 38P, 38S, the first logic systems 40P, 40S, and the self-test systems 44P, 44S. The processor 34 receives instructions to lock or unlock the lockable device 14 from the computer 12. The processor 34 causes the lockable device 14 to be in the locked state by default if no instructions or an error is received from the computer 12.

The processor 34 is arranged to transmit signals 64 to the self-test systems 44P, 44S. The processor 34 is arranged to transmit signals 60 to the first logic systems 40P, 40S. The processor is arranged to transmit signals 56 to the retriggerable timers 38P, 38S. The processor 34 is arranged to receive a signal 72 from the self-test systems 44P, 44S. The self-test signals 72 comprise information indicative of the state and health of the relay systems 46P, 46S. The processor 34 is illustratively a Peripheral Interface Controller (PIC) Microcontroller (sometimes called Pic32 or Pic32 UC).

The retriggerable timers 38P, 38S communicate with the processor 34 and the first logic systems 40P, 40S as shown in FIG. 3. The retriggerable timers 38P, 38S are arranged to transmit signals 58 to the first logic systems 40P, 40S for a determined period of time in response to the signal 56 from the processor 34. In some embodiments, the period of time is about 0.1 millisecond to about 10 milliseconds. In the illustrative embodiment, the period of time is about 3 milliseconds. The retriggerable timers 38P, 38S continue to transmit signals 58 if the signal 56 continues to be received by the retriggerable timers 38P, 38S. The retriggerable timer 38P is arranged to transmit the signal 58P to both the primary and secondary first logic systems 40P, 40S. The secondary retriggerable timer 38S is arranged to transmit the signal 58S to the primary and the secondary first logic systems 40P, 40S.

The first primary logic system 40P is arranged to receive the primary signal 60P, the signal 58P, and the signal 58S. The first primary logic system 40P is further arranged to evaluate the signal 60P, the signal 58P, and the signal 58S. If, and only if, each of the signal 60P, the signal 58P, and the signal 58S are equal to predetermined values, respectively, such as, for example all are TRUE, the primary logic system 40P transmits a plurality of signals 62P to the second primary logic system 42P. If any of the signal 60P, the signal 58P, and the signal 58S are not equal to the predetermined values such as, for example one is FALSE, the primary logic system 40P does not transmit signals 62P to the second primary logic system 42P. The first primary logic system 40P is arranged to transmit any one or more signals 62P. For example, the first primary logic system 40P may transmit signal 62P to a first and a third gate included in the second primary logic system 42P. In the illustrative embodiment, the primary logic system 40P is a three-input logic gate. The secondary logic system 40S is substantially similar to the primary logic system 40P and is not discussed in detail.

The primary self-test system 44P is arranged to receive the signal 64 from the processor 34. The primary self-test system 44P is further arranged to transmit a signal 66P to the second primary logic system 42P if the signal 64 is equal to a predetermined value such as, for example, TRUE. The primary self-test system 44P is further arranged to receive signals 70P from the primary relay system 46P. The primary self-test system 44P evaluates the signals 70P and transmits a signal 72 to the processor 34 including information indicative of the primary relay system 46P status and health. The primary self-test system 44P is arranged to transmit any one or more signals 66P. For example, the primary self-test system 44P may transmit signal 66P to the first and the third gate included in the second primary logic system 42P. The secondary self-test component 44S is substantially the same as the primary self-test system 44P and is not discussed in detail.

The second primary logic system 42P is arranged to control selectively the primary relay system 46P as shown in FIG. 3. The second primary logic system 42P is arranged to receive the signal 62P from the first primary logic system 40P and the signals 66P from the primary self-test system 44P. The second primary logic system 42P evaluates the signals 62P and the signals 66P and transmits signals 68P to close one or more relays 32 included in the primary relay system 46P. The second primary logic system 42P transmits signals 68 if, and only if, the signals 62 are equal to a predetermined values and the signals 66 are equal to a predetermined values. For example, the second primary logic system 42P transmits signals 68 if, and only if, the signal 62P is TRUE and the signal 66P TRUE.

Illustratively, the second primary logic gate 42P comprises a gate 68 for each primary relay 32. In the illustrative embodiment, the second primary logic gate system 42P includes a plurality of gates 68A, 68B, 68C, 68D. Each gate 68A, 68B, 68C, 68D is illustratively connected to primary relays 32A, 32B, 32C, 32D respectively. In the illustrative embodiment, each gate 68 is a two-input logic gate.

Each gate 68A, 68B, 68C, 68D is arranged to receive and evaluate signal 62P and signal 66P. The second primary logic system 40P is arranged to transmit selectively signal 62P to each gate 68A, 68B, 68C, 68D individually. The primary self-test system 44P is arranged to transmit selectively signal 66P to each gate 68A, 68B, 68C, 68D individually. As such, each gate 68A, 68B, 68C, 68D is arranged to be controlled individually so that relays 32A, 32B, 32C, 32D may be controlled individually. The second secondary logic system 42S is substantially the same as the second primary logic system 42P and is not discussed in detail.

The relay systems 46P, 46S control selectively the trigger lock 82 as shown in FIG. 3. The relay systems include the plurality of relays 32. The relay systems 46P, 46S are arranged to activate and move the trigger lock 82 from the locked state to the unlocked state. The relays 32 default to block the trigger lock 82 from moving from the unlocked state to the locked state.

The primary relay system 46P includes the plurality of relays 32. Each relay 32 is arranged to receive one of the signals 68 respectively. When a relay 32 receives the signal 68, the relay 32 activates. Each relay 32A, 32B, 32C, 32D included in the primary relay system 46P is connected in series each relay 32A, 32B, 32C, 32D included in the secondary relay system respectively. For example, the relay 32A of the primary relay system 46P is connected in series with the relay 32A of the secondary relay system 46P. Each pair of relays 32 are also connected in series with a lockable device 14. Illustratively, relays 32A, 32A are connected in series with the LASER 14. If, and only if, both relays 32A, 32A are active then the trigger lock 82 for the lockable device 14 is moved from the locked state to the unlocked state.

In the illustrative embodiment, the relays 32 default to the open position. When the relay 32A of the primary relay system 46P receives the signal 68P, the relay 32A moves to the closed position to complete a portion of the electric circuit. When the relay 32A of the secondary relay system 46S receives the signal 68S, the relay 32A moves to the closed position to complete the other portion of the electric circuit. As such, the electric circuit is complete and current flows through the relays 32A, 32A into the trigger lock 82 to move the trigger lock 82 into the unlocked state. In the unlocked state, the LASER head 76 is free to move from the inactive state to the active state to cause the LASER head 76 to produce a LASER beam.

A method 100 for using the control system comprises a plurality of steps. In a first step 102, the processor 34 receives a first data packet from the computer 12 instructing the processor 34 not to move the lockable device 14 from the locked state to the unlocked state. The processor 34 returns a second data packet including information indicative of the state and health of the interface module 16. If the first data packet is not received by the processor 34, the interface module 16 moves the lockable device 14 to the locked state.

If the second data packet or any nth data packet is not received by the computer 12, the computer 12 does not transmit additional data packets and the process ends. Because the interface module 16 is no longer receiving data packets from the computer 12, the interface module 16 does not move the lockable device 14 into the unlocked state and the locking system 10 blocks the lockable device 14 from moving to the unlocked state until a user intervenes with the locking system 10.

In a second step 104, the processor 34 receives a third data packet from the computer 12 instructing the processor 34 to unlock the lockable device 14. The processor 34 returns a fourth data packet including information indicative of the state and health of the interface module 16. The computer 12 transmits an nth number of data packets instructing the processor 34 to unlock the lockable device 14 as long as a user instructs the computer 12 to unlock the lockable device 14. The processor transmits an (n+1)th number of data packets to the computer 12 in response to receiving the nth data packets from the computer 12.

If the third data packet or any nth data packet is not received by the processor 34, the interface module 16 moves the lockable device 14 to the locked state. If the fourth data packet or any (n+1)th data packet is not received by the computer 12, the computer 12 does not transmit additional nth data packets and the process ends. Because the interface module 16 is no longer receiving data packets from the computer 12, the interface module 16 does not move the lockable device 14 into the unlocked state and the locking system 10 blocks the lockable device 14 from moving to the unlocked state until a user intervenes with the locking system 10.

In a third step 106, in response to the instructions to unlock the lockable device 14, the processor 34 transmits a primary signal 60P to the primary logic system 40P and a secondary signal 60S to the secondary logic system 40S. The processor 34 continuously delivers the signals 60P, 60S until the processor 34 fails to receive unlock instructions from the computer 12. The processor 34 transmits a signal 64P to the primary self-test system 44P and a signal 64S to the secondary self-test system 44S.

In a fourth step 108, the processor 34 transmits a signal 56P to the primary retriggerable timer 38P and a signal 56S to the secondary retriggerable timer 38S. In the illustrative embodiment, the signals 56P, 56S comprise a set increase in voltage over a set period of time. For example, the voltage of signals 56P, 56S increase from about 0 to about 5 volts in about 1 millisecond.

In a fifth step 110, the primary retriggerable timer 38P transmits a first signal 58P and a second signal 58P. The first signal 58P is received by the primary logic system 40P and the second signal 58P is received by the first secondary logic system 40S. The secondary retriggerable timer 38S transmits a first signal 58S and a second signal 58S. The first signal 58S is received by the secondary logic system 40S and the second signal 58S is received by the first primary logic system 40P. The signals 58P, 58P, 58S, 58S are generated for a set time, after the set time expires, the retriggerable timers 38P, 38S stop generating the signals 58P, 58P, 58S, 58S. In the illustrative embodiment, the set time is about 3 milliseconds.

In a sixth step, the primary logic system 40P evaluates the primary signal 60P, the first signal 58P, and the first signal 58S. If, and only if, each of the primary signal 60P, the first signal 58P, and the first signal 58S are TRUE, the primary logic system 40P transmits one or more of the plurality of primary signals 62 to the second primary logic system 42P. If any of the primary signal 60P, the first signal 58P, and the first signal 58S are FALSE, the primary logic system 40P does not transmit primary signals 62 to the second primary logic system 42P.

The first secondary logic system 40S evaluates the secondary signal 60S, the second signal 58P, and the second signal 58S. If, and only if, each of the secondary signal 60S, the second signal 58P, and the second signal 58P are TRUE, the first secondary logic system 40S transmits one or more of the plurality of secondary signals 62S to the second secondary logic system 42S. If any of the secondary signal 60S, the second signal 58P, and the second signal 58S are FALSE, the first secondary logic system 40S does not transmit secondary signals 62B to the second secondary logic system 42S.

In a seventh step 112, the primary self-test system 44P evaluates the signal 64P from the processor 34. If the signal 64P is equal to a predetermined value, the primary self-test system 44P transmits one or more of the plurality of signals 66P to the second primary logic system 42P. The secondary self-test system 44S evaluates the signal 64S from the processor 34. If the signal 64S is equal to a predetermined value, the secondary self-test system 44S transmits one or more of the plurality of signals 66S to the second secondary logic system 42S.

In an eighth step 114, each gate 68A, 68B, 68C, 68D included in the second primary logic system 42P evaluates the signal 70P and the signal 62P. If, and only if, the signal 70P and the signal 62P are both TRUE, the individual gates 68A, 68B, 68C, 68D transmits a signal 68 to open the respective primary relays 32A, 32B, 32C, 32D.

The signal 70P and 62P may be different for each gate 68A, 68B, 68C, 68D. For example, the signal 70P may be TRUE for gate 68A, TRUE for gate 68B, FALSE for gate 68C and TRUE for gate 68D. The signal 62P may be TRUE for gate 68A, FALSE for gate 68B, FALSE for gate 68C and TRUE for gate 68D. As such, gate 68A and gate 68D transmit signal 68, but gates 68B, 68C do not. Any combination of signals 70P, 62P are within the scope of this disclosure. In the illustrative embodiment, the signals 70P, 62P comprise the same combinations of TRUE/FALSE values.

Each gate 68A, 68B, 68C, 68D included in the second secondary logic system 42S evaluates the signal 70S and the signal 62S. If, and only if, the signal 70S and the signal 62S are both TRUE, the individual gates 68B transmits a signal 68S to open the respective secondary relays 32A, 32B, 32C, 32D.

The first primary relay 32A and the first secondary relay 32A are wired in series with the lockable device 14. When the first primary relay 32A and the first secondary relay 32A are both open, current is allowed to flow through the relays 32A, 32A to the lockable device 14 to power the lockable device 14. As such, the lockable device 14 is moved from the locked to the unlocked state.

In a ninth step 116, information indicative of the status of the primary and secondary relay systems 46P, 46S is sensed by the primary and secondary self-test systems 44P, 44S respectively as shown in FIG. 3. The self-test systems 44P, 44S transmit information indicative of the status and health of the relay systems 46P, 46S to the processor 34 via signals 72P, 72S. The processor 34 determines if any of the relays 32 are broken. If any of the relays 32 are broken, the processor 34 stops transmitting the signal 56, the signal 60, and the signal 64. As such, none of the relays 32 can be instructed to move to the closed position. As a result, the series circuit is broken and the lockable device 14 is moved to the locked state.

The processor 34 evaluates the signals 72P, 72S and compares the state and health of the relays 32 to the theoretical state of the relays based on the instructions from the computer 12. If the states do not match, the processor 34 determines that a checkpoint has failed and transmits the information to the computer 12. As a result, the computer 12 blocks the lockable device 14 from moving to the unlocked state.

Each component of the interface module 16 comprises a checkpoint. For example, if the processor 34 is transmitting signals 56P, 56S and one or both retriggerable timer systems 38P, 38S fail to transmit signal 58P, 58S then a checkpoint has failed.

In the illustrative embodiment, after any checkpoint is failed, the computer 12 blocks the lockable device 14 from moving to the unlocked state and, thus, may not be activated until a user has intervened with the locking system 10. In other embodiments, the lockable device 14 may be allowed to move to the unlocked state and, thus, may be activated after a set amount of time has passed after a checkpoint has failed. In other embodiments, the computer 12 may run a plurality of tests and re-run the checkpoints after a checkpoint fails. If the second series of checkpoints pass, the lockable device 14 may be moved to the unlocked state. If the second series of checkpoints fail, the lockable device 14 may not be moved to the unlocked state until a user has intervened with the locking system 10.

The interface module 16 may run a self-test without moving the lockable device 14 to the unlocked state. As such, the self-test can be performed while the system is operating. During the self-test, the processor 34 transmits signals 56P, 56S to the retriggerable systems 38P, 38S. The processor 34 transmits signal 60P to the first primary logic system 40P and the signal 64P to the self-test system 44P. As such, the primary circuit 36P is active. The processor 34 does not transmit signal 60S to the first secondary logic system 40S and the signal 64S to the self-test system 44S. As such, the secondary circuit 36S is not active. Because only one of the primary or secondary circuits 36P, 36S is active, the relays 32 included in the secondary circuit 36S are open. With the relays 32 open, the series connection with all lockable devices 14 is broken. As such, the lockable devices 14 are in the locked state. The processor 34 may then send instructions to the first primary logic system 40P to test each gate 68 and relay 32 individually.

As shown in FIG. 4, any failure in the interface module 16 results in the lockable device 14 in the locked state. If one relay 32A fails closed, the other relay 32A defaults in the open position and the circuit is broken. If the relays 32 fail open, the circuit is broken. If one of the retriggerable timer systems 38 fails such that it is transmitting signal 58 unintentionally, the other non-failed retriggerable timer system 38 does not transmit signals 58 and the relays 32 will not close. If the processor 34 hardware fails, the signals 56, 60, 64 will not be transmitted and the relays 32 will be open and the circuit broken. If the processor 34 software fails, the signals 56, 60, 64 will not be transmitted and the relays 32 will be open and the circuit broken. If the connection between the processor 34 and the computer 12 fails, the processor 34 does not transmit signal 56 and the relays will be open and the circuit broken. If the computer 12 fails, the processor 34 does not receive packets from the computer 12 and the processor 34 does not transmit signal 56 and the relays will be open and the circuit broken.

Figure 5:
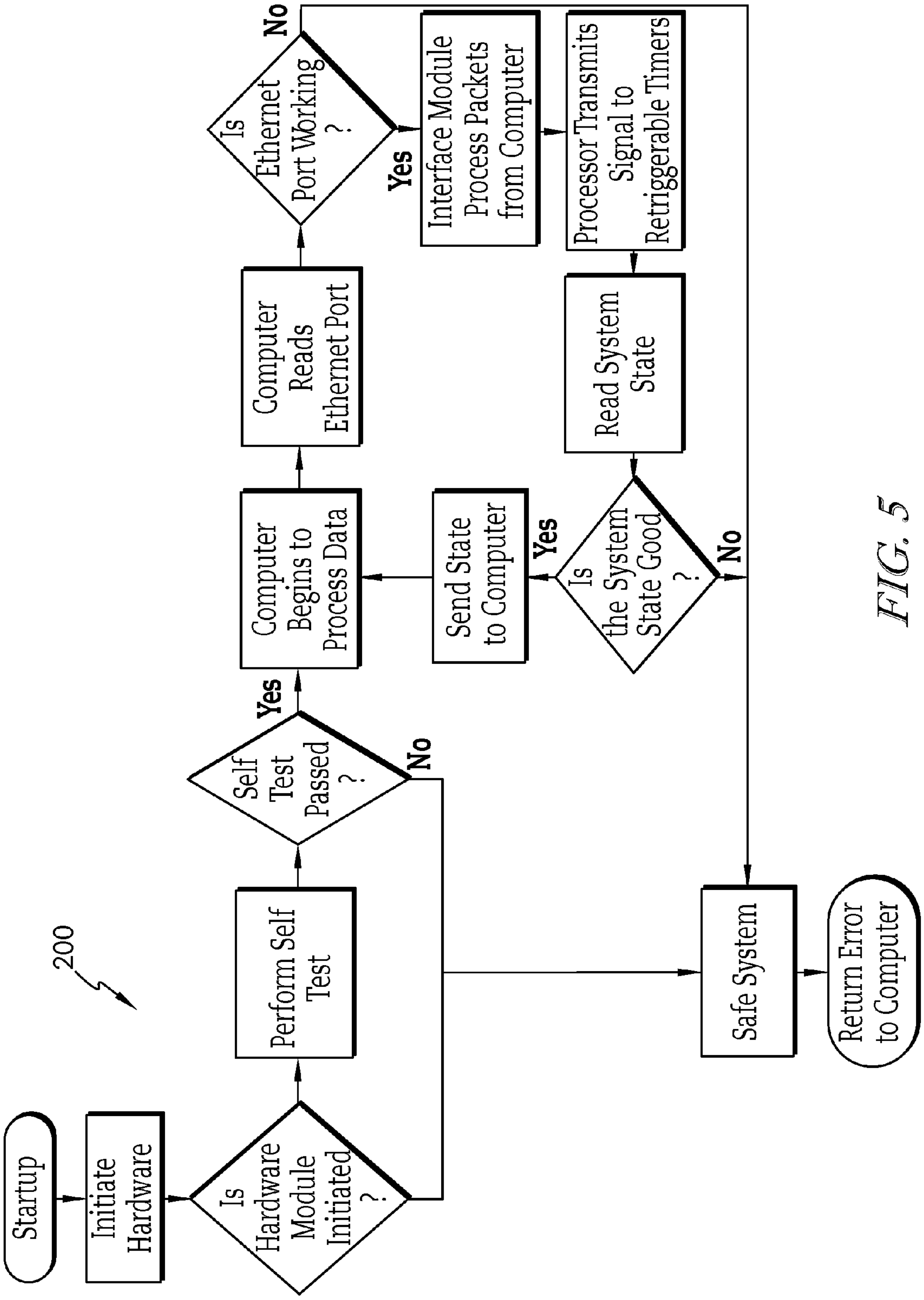
FIG. 5 is a diagrammatic depiction of a method of using the illustrative locking system.

FIG. 5 shows an illustrative method 200 of starting the interface module. The interface module performs a number of checks and returns errors to the computer 12 if any failure occurs. The interface module 16 comprises processor 34 and discrete logic. In the illustrative embodiment, other than the processor 34 and power, there is no common hardware between primary and secondary circuits 36. Illustratively, the power system that powers the interface module 16 is fed by a power supply that has overvoltage protection.

Referring to FIG. 5, the method 200 begins when power is supplied to the interface module 16 and the interface module 16 is powered on. The processor 34 performs an initialization step and configures a digital I/O port expander to be used. After the port expanders are initialized, the processor 34 attempts to confirm proper configuration of the port expanders. After the initialization step is complete, the processor 34 will enter perform a power-on self-test step (sometimes called a POST step). During the power-on self-test, the processor 34 will cycle all channels individually to verify proper operation. In the illustrative embodiment, the processor cycles four channels, eight relays 32 total, individually to verify proper operation.

After a successful power-on self-test, the interface module 16 will be placed in operation mode and a self-test bit will be set. If the power-on self-test determines there is a system error then the interface module will not allow the shutters to open and, thus, the lockable device 14 will be inactive.

After a successful power self-test, the processor 34 will enter operational mode. In the operational mode the processor 34 waits in an endless loop and determines if a data packet has been received during each loop. When a packet is received, the packet is parsed and the data checksum is verified. When the data checksum is correct then the data will be processed.

The processor 34 will set or clear a bit based on the computer 12 datagram. If the bit is not toggled from the computer 12, then the bit won't toggle on the processor 34.

The bit toggle are fed to two retriggerable discrete logic circuits 38 (sometimes called RDLC). A first retriggerable discrete logic circuit 38P is included on the primary relay channel and a second retriggerable discrete logic circuits 38S is included on the secondary relay channel. The retriggerable discrete logic circuits detect failures and safe the system if the processor 34 fails to toggle the bit or the computer 12 fails to send the toggle command. The retriggerable discrete logic circuits 38 will timeout after about 5 milliseconds and close all relays.

The next data processed is the shutter open/close command. A go/nogo output from the retriggerable logic circuits 38 are fed into an "AND" gate and are ANDed with the shutter open/close command. If the shutter open/close command goes low or closed, the AND gate will output a logic low therefore inhibiting laser fire. The AND gates are separate chips for both the primary and secondary relay channels.

The next step is to process the second shutter open/close command. In the illustrative embodiment, the shutter open/closed command is fed into the digital I/O port expanders via a sync serial interface. When the serial command is sent to the port expanders, the chips toggle the appropriate bits to send to the primary and secondary shutter relay banks. The bits are ANDed again with the previous shutter open/closed command. The open signal is given to the relays only when both bits agree.

When the relays 32 open, the port expanders read the relay states and verify that the commanded state is the measured state. If the states don't agree, the interface module 16 will safe the relays 32 and return an error to the computer.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A locking system for unlocking a lockable device, the locking system comprising:

a failsafe lockable device arranged to move between a locked state in which the lockable device is blocked from being activated and an unlocked state in which the lockable device is free to be activated, a computer processor connected with the lockable device and configured to receive a request from the lockable device to move the lockable device between the locked state and the unlocked state and to transmit a request signal for unlocking the lockable device, and an interface module in electronic communication with the computer processor and the lockable device, the interface module including an interface-module processor connected to the computer processor, a primary circuit connected to the interface-module processor, and a secondary circuit connected to the interface-module processor, and wherein the interface-module processor is configured to send a first set of electric signals to the primary circuit and a second set of electric signals to the secondary circuit in response to receiving the request signal from the computer processor, the primary circuit is configured to default to an inactive state and to move to an activate state if the first set of electric signals are equal to a first set of predetermined values, the secondary circuit is configured to default to an inactive state and to move to an activate state if the second set of electric signals are equal to a second set of predetermined values, the interface module is configured to block the lockable device from moving to the unlocked state if at least one of the primary circuit and the secondary circuit is in the inactive state, and the interface module is configured to allow the lockable device to move to the unlocked state if both the primary circuit and the secondary circuit are in the activated state.

2. The locking system of claim 1, wherein the lockable device comprises a laser and the interface module is configured to cause the laser to move to the locked state if communication between the interface-module and at least one of the computer processor and the lockable device is interrupted.

3. The locking system of claim 1, wherein the primary circuit includes a primary self-test system, a primary retriggerable timer system, a first primary logic system, a second primary logic system, and a primary relay system; the primary self-test system is connected with the interface-module processor, the second primary logic system, and the primary relay system; the primary retriggerable timer system is connected with the interface-module processor, the first primary logic system, and the secondary circuit; the first primary logic system is connected with the interface-module processor, the primary retriggerable timer system, and the second primary logic system; the second primary logic system is connected with the primary self-test system, the first primary logic system, and the primary relay system; and the primary relay system is connected with the primary self-test system, the second primary logic system, and the lockable device.

4. The locking system of claim 3, wherein the secondary circuit includes a secondary self-test system, a secondary retriggerable timer system, a first secondary logic system, a second secondary logic system, and a secondary relay system; the secondary self-test system is connected with the interface-module processor, the second secondary logic system, and the secondary relay system; the secondary retriggerable timer system is connected with the interface-module processor, the first secondary logic system, and the first primary logic system; the first secondary logic system is connected with the interface-module processor, the secondary retriggerable timer system, and the second secondary logic system; the second secondary logic system is connected with the secondary self-test system, the first secondary logic system, and the secondary relay system; and the secondary relay system is connected with the secondary self-test system, the second secondary logic system, and the lockable device.

5. The locking system of claim 4, wherein the primary relay system is configured to transmit relay signals to the primary self-test system, the secondary relay system is configured to transmit relay signals to the secondary self-test system, the second primary logic system includes a plurality of logic gates, and the second secondary logic system includes a plurality of logic gates.

6. The locking system of claim 4, wherein the interface-module processor is arranged to transmit a first primary signal to the primary retriggerable timer system and a first secondary signal to the secondary retriggerable timer system, the primary retriggerable timer system is configured to transmit primary trigger signals to the first primary logic system and to the first secondary logic system for a predetermined period of time in response to receiving the first primary signal from the interface-module processor and the secondary retriggerable timer system is configured to transmit secondary trigger signals to the first primary logic system and the first secondary logic system for a predetermined period of time in response to receiving the first secondary signal from the interface-module processor.

7. The locking system of claim 6, wherein the interface-module processor is arranged to transmit a second primary signal to the first primary logic system and a second secondary signal to the first secondary logic system, the first primary logic system is configured to transmit primary logic signals to the second primary logic system if each of the second primary signal, the primary trigger signals, and the secondary trigger signals received by the first primary logic system are equal to corresponding predetermined first primary-logic values, and the first secondary logic system is configured to transmit secondary logic signals to the second secondary logic system if each of the second secondary signal, the primary trigger signals, and the secondary trigger signals received by the first secondary logic system are equal to corresponding predetermined first secondary-logic values.

8. The locking system of claim 7, wherein the interface-module processor is arranged to transmit a third primary signal to the primary self-test system and a third secondary signal to the secondary self-test system, the primary self-test system is configured to transmit primary test signals from the primary self-test system to the second primary logic system if the third primary signal received by the primary self-test system is equal to a predetermined primary-test value, and the secondary self-test system is configured to transmit secondary test signals from the secondary self-test system to the second secondary logic system if the third secondary signal received by the secondary self-test system is equal to a predetermined secondary-test value.

9. The locking system of claim 8, wherein the second primary logic system is configured to generate primary activation signals if the primary logic signals and the primary test signals received by the second primary logic system are equal to corresponding predetermined second primary-logic values.

10. The locking system of claim 9, wherein the primary relay system includes a plurality of electrically operated primary relays and each primary relay is configured to activate in response to receiving a corresponding one of the primary activation signals received from the second primary logic system.

11. The locking system of claim 9, wherein the second secondary logic system is configured to generate secondary activation signals if the secondary logic signals and the secondary test signals received by the second secondary logic system are equal to corresponding predetermined second secondary-logic values.

12. The locking system of claim 11, wherein the secondary relay system includes a plurality of electrically operated secondary relays and each secondary relay is configured to activate in response to receiving a corresponding one of the secondary activation signals received from the second secondary logic system.

13. The locking system of claim 12, wherein the primary relay system includes a plurality of electrically operated primary relays and each primary relay is configured to activate in response to receiving a corresponding one of the primary activation signals received from the second primary logic system and the interface module moves the lockable device to the unlocked state in response to each of the primary and secondary relays being activated and blocks the lockable device from moving to the unlocked state if at least one primary relay or secondary relay is inactive.

14. The locking system of claim 1, wherein the interface module is further configured to move the lockable device from the unlocked state to the locked state if at least one of the primary circuit and the secondary circuit default to the inactive state.

* * * * *